(12) United States Patent
Wang et al.

(10) Patent No.: US 11,475,624 B2
(45) Date of Patent: Oct. 18, 2022

(54) METHOD AND APPARATUS FOR GENERATING THREE-DIMENSIONAL MODEL, COMPUTER DEVICE AND STORAGE MEDIUM

(71) Applicant: BEIJING SENSETIME TECHNOLOGY DEVELOPMENT CO., LTD., Beijing (CN)

(72) Inventors: Pengrui Wang, Beijing (CN); Chunze Lin, Beijing (CN); Quan Wang, Beijing (CN); Chen Qian, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/552,621

(22) Filed: Dec. 16, 2021

(65) Prior Publication Data
US 2022/0108517 A1    Apr. 7, 2022

Related U.S. Application Data

(63) Continuation of application No. PCT/CN2021/083109, filed on Mar. 25, 2021.

(30) Foreign Application Priority Data

Jun. 30, 2020 (CN) .......................... 202010621454.6

(51) Int. Cl.
*G06T 7/70* (2017.01)
*G06T 15/50* (2011.01)
(Continued)

(52) U.S. Cl.
CPC .......... *G06T 15/04* (2013.01); *G06N 3/0454* (2013.01); *G06N 3/08* (2013.01); *G06T 7/70* (2017.01);
(Continued)

(58) Field of Classification Search
CPC ..................... G06T 17/00; G06T 17/20; G06T 2207/30201
See application file for complete search history.

(56) References Cited

U.S. PATENT DOCUMENTS

2018/0253593 A1    9/2018   Hu et al.
2018/0308276 A1*  10/2018   Cohen ..................... G06T 13/40
(Continued)

FOREIGN PATENT DOCUMENTS

CN        103729883 A        4/2014
CN        106327571 A        1/2017
(Continued)

OTHER PUBLICATIONS

"Displacement mapping." Wikipedia, Wikimedia Foundation, Apr. 9, 2018, en.wikipedia.org/w/index.php?title=Displacement_mapping &oldid=835516965 (Year: 2018).*
(Continued)

*Primary Examiner* — Ryan McCulley
(74) *Attorney, Agent, or Firm* — Cooper Legal Group, LLC

(57) ABSTRACT

Provided are a method and apparatus for generating a three-dimensional model. The method includes following. A first image containing a first face is acquired. First point cloud data including contour information of the first face is determined based on the first image. First albedo information of the first face and second point cloud data including detail information of the first face are determined based on the first point cloud data and the first image. A three-dimensional model of the first face is generated based on the first albedo information and the second point cloud data.

17 Claims, 9 Drawing Sheets

(51) Int. Cl.
  *G06T 17/20* (2006.01)
  *G06T 15/04* (2011.01)
  *G06N 3/04* (2006.01)
  *G06N 3/08* (2006.01)
  *G06V 40/16* (2022.01)

(52) U.S. Cl.
  CPC ............ *G06T 15/506* (2013.01); *G06T 17/20* (2013.01); *G06T 2207/10028* (2013.01); *G06T 2207/20081* (2013.01); *G06T 2207/30201* (2013.01); *G06V 40/165* (2022.01)

(56) References Cited

U.S. PATENT DOCUMENTS

| | | | |
|---|---|---|---|
| 2019/0035149 | A1 | 1/2019 | Chen et al. |
| 2020/0013214 | A1* | 1/2020 | Kuffner .................. G06T 15/20 |
| 2020/0160593 | A1* | 5/2020 | Gu ............................. G06N 3/08 |
| 2020/0286301 | A1* | 9/2020 | Loper ........................ G06T 7/80 |
| 2021/0019939 | A1* | 1/2021 | Hu ............................ G06T 19/20 |
| 2021/0390770 | A1* | 12/2021 | Kuo ........................... G06T 7/60 |

FOREIGN PATENT DOCUMENTS

| | | |
|---|---|---|
| CN | 108776990 A | 11/2018 |
| CN | 109146934 A | 1/2019 |
| CN | 109919876 A | 6/2019 |
| CN | 110363858 A | 10/2019 |
| CN | 110706339 A | 1/2020 |
| CN | 111080662 A | 4/2020 |
| CN | 111784821 A | 10/2020 |
| KR | 20180100476 A | 9/2018 |

OTHER PUBLICATIONS

Lattas, Alexandros, et al. "AvatarMe: Realistically Renderable 3D Facial Reconstruction" in-the-wild"." Proceedings of the IEEE/CVF conference on computer vision and pattern recognition. 2020. (Year: 2020).*

Pengrui Wang, et al. "Low-Frequency Guided Self-Supervised Learning For High-Fidelity 3D Face Reconstruction In The Wild." 2020 IEEE International Conference on Multimedia and Expo (ICME), Jul. 6, 2020, 6 pages.

Zollhöfer Michael, et al. "State of the art on monocular 3D face reconstruction, tracking, and applications." Computer Graphics Forum. vol. 37. No. 2. 2018, 28 pages.

Yamaguchi Shugo, et al. "High-fidelity facial reflectance and geometry inference from an unconstrained image." ACM Transactions on Graphics (TOG) 37.4 (2018): 1-14.

Deng Yu, et al. "Accurate 3D face reconstruction with weakly-supervised learning: From single image to image set." Proceedings of the IEEE Conference on Computer Vision and Pattern Recognition Workshops. 2019, 11 pages.

Tewari Ayush, et al. "MoFa: Model-based deep convolutional face autoencoder for unsupervised monocular reconstruction." Proceedings of the IEEE International Conference on Computer Vision Workshops. 2017, 10 pages.

Tewari Ayush, et al. "Self-supervised multi-level face model learning for monocular reconstruction at over 250 Hz." Proceedings of the IEEE Conference on Computer Vision and Pattern Recognition. 2018, 11 pages.

Tran Luan, and Xiaoming Liu. "On learning 3D face morphable model from in-the-wild images." IEEE transactions on pattern analysis and machine intelligence (2019), 14 pages.

International Search Report and English Translation cited in PCT/CN2021/083109, dated Jun. 23, 2021, 10 pages.

Written Opinion and English Translation cited in PCT/CN2021/083109, dated Jun. 23, 2021, 10 pages.

"Fast Landmark Localization With 3D Component Reconstruction and CNN for Cross-Pose Recognition", Aug. 2017, Gee-Sern (Jison) Hsu, Hung-Cheng Shie and Cheng-Hua Hsieh, IEEE Transactions on Circuits and Systems for Video Tech, vol. 28, 14 pgs.

First Office Action of the Korean application No. 10-2021-7042401, dated Apr. 13, 2022, 18 pgs.

"Sampling and Modeling of Shape and Reflectance of 3-D Objects", 2006, Ryo Furukawa, Hiroshi Kawasaki, Yasuaki Nakamura and Yutaka Ohsawa, From the Journal—The Journal of The Institute of Image Information and Television Engineers, vol. 60, No. 4, 8 pgs.

First Office Action of the Japanese application No. 2021-574821, dated Jul. 20, 2022, 7 pgs.

Notice of Allowance of the Korean application No. 10-2021-7042401, dated Aug. 18, 2022, 5 pgs.

"3D Morphable Face Models-Past, Present, and Future", Jun. 2020, Bernhard Egger, William A.P. Smith, Ayushtewari, Stefanie Wuhrer, Michael Zollhoefer, Thabo Beeler, Florian Bernard, Timo Bolkart, Adam Kortylewski, Sami Romdhani, Christian Theobalt, Voler Blanz and Thomas Vetter, ACM Transactions on Graphics, vol. 39, No. 5, pp. 1-38.

Supplementary European Search Report in the European application No. 21819708.5, dated Aug. 16, 2022, 8 pgs.

"3D Face Reconstruction With Geometry Details From a Single Image", Jun. 2018, Luo Jiang, Juyong Zhang, Bailin Deng and Ligang Liu, IEEE Transactions on Image Processing, 38 pgs.

* cited by examiner

METHOD AND APPARATUS FOR GENERATING THREE-DIMENSIONAL MODEL, COMPUTER DEVICE AND STORAGE MEDIUM

CROSS-REFERENCE TO RELATED APPLICATION

This is a continuation of International Application No. PCT/CN2021/083109, filed on Mar. 25, 2021, which claims priority to Chinese patent application No. 202010621454.6, filed on Jun. 30, 2020. The contents of International Application No. PCT/CN2021/083109 and Chinese patent application No. 202010621454.6 are incorporated herein by reference in their entireties.

BACKGROUND

The generation of three-dimensional digital face models plays an important role in the fields of film and television, games, and virtual socialization. The method of face generation (reconstruction) based on a single image only relies on cheap webcams for data acquisition and is convenient for application in mobile terminals, and thus has great application values.

The existing method for generating a three-dimensional face model has the problem that the generated three-dimensional face model has low precision.

SUMMARY

The disclosure relates to, but is not limited to, the technical field of three-dimensional reconstruction, and in particular to a method and apparatus for generating a three-dimensional model, a computer device, storage medium, and a computer program product.

The embodiments of the disclosure provide a method for generating a three-dimensional model. The method includes as follows: acquiring a first image containing a first face; determining, based on the first image, first point cloud data including contour information of the first face; determining, based on the first point cloud data and the first image, first albedo information of the first face and second point cloud data including detail information of the first face; and generating a three-dimensional model of the first face based on the first albedo information and the second point cloud data.

The embodiments of the disclosure further provide an apparatus for generating a three-dimensional model. The apparatus includes: an acquisition module, configured to: acquire a first image containing a first face, and to obtain, based on the first image, first point cloud data including contour information of the first face; a determination module, configured to obtain, based on the first point cloud data and the first image data, first albedo information of the first face and second point cloud data including detail information of the first face; and a fusion module, configured to obtain a three-dimensional model of the first face based on the first albedo information and the second point cloud data.

The embodiments of the disclosure further provide a computer device. The device includes a processor and a memory having stored thereon machine-readable instructions executable by the processor. The processor is configured to execute the machine-readable instructions stored in the memory, and the machine-readable instructions, when executed by the processor, cause the processor to execute actions of a method for generating a three-dimensional model, the method including: acquiring a first image containing a first face; determining, based on the first image, first point cloud data including contour information of the first face; determining, based on the first point cloud data and the first image, first albedo information of the first face and second point cloud data including detail information of the first face; and generating a three-dimensional model of the first face based on the first albedo information and the second point cloud data.

The embodiments of the disclosure further provide a computer-readable storage medium having stored thereon a computer program that, when run, implements actions of a method for generating a three-dimensional model, the method including: acquiring a first image containing a first face; determining, based on the first image, first point cloud data including contour information of the first face; determining, based on the first point cloud data and the first image, first albedo information of the first face and second point cloud data including detail information of the first face; and generating a three-dimensional model of the first face based on the first albedo information and the second point cloud data.

The embodiments of the disclosure further provide a computer program product. The computer program product includes a non-transitory computer-readable storage medium having stored thereon a computer program that, when read and executed by a computer, causes the computer to implement some or all of the actions of the method described in the embodiments of the disclosure.

In order to make the above objectives, features and advantages of the embodiments of the disclosure clearer and more understandable, description is made below by referring to exemplary embodiments in conjunction with the accompanying drawings.

BRIEF DESCRIPTION OF THE DRAWINGS

In order to explain the technical solutions in the embodiments of the disclosure more clearly, the following will briefly introduce the drawings needed in the embodiments. The drawings here are incorporated into the specification and constitute a part of the specification. These accompanying drawings illustrate the embodiments conforming to the disclosure, and together with the specification serve to explain the technical solutions of the disclosure. It should be understood that the following drawings only show some embodiments of the disclosure, and therefore should not be regarded as limiting the scope. For those skilled in the art, other related drawings may be obtained according to these drawings without any creative effort.

DETAILED DESCRIPTION

Figure 1:
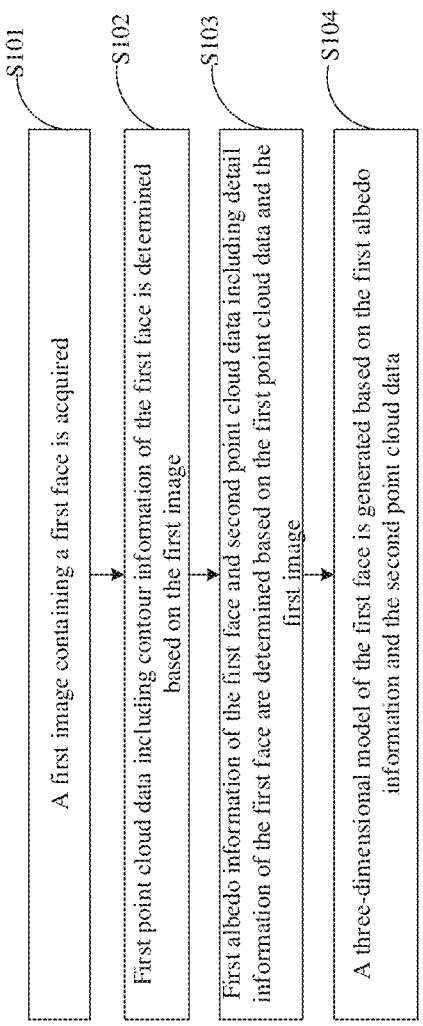
FIG. 1 illustrates a schematic flowchart of a method for generating a three-dimensional model according to embodiments of the disclosure.

In order to make the objectives, technical solutions and advantages of the embodiments of the disclosure clearer, the technical solutions in the embodiments of the disclosure will be described clearly and completely in combination with the accompanying drawings in the embodiments of the disclosure. It is apparent that the described embodiments are only some but not all embodiments of the disclosure. The components of the embodiments of the disclosure generally described and illustrated in the drawings herein may be arranged and designed in a variety of different configurations. Therefore, the following detailed description of the embodiments of the disclosure provided in the accompanying drawings is not intended to limit the claimed scope of the disclosure, but merely represents selected embodiments of the disclosure. According to the embodiments of the disclosure, all other embodiments obtained by those skilled in the art without creative effort should fall within the protection scope of the disclosure.

In the related art, methods for generating a three-dimensional face model from a two-dimensional image mainly include real-time resolving based fitting methods and model training based regression learning methods. It usually takes minutes for the real-time resolving based fitting methods to reconstruct a face due to large amounts of calculation, which is time-consuming and has poor robustness. The model training based regression learning methods mainly rely on deep learning technology and learn complex mapping functions through a large amount of training data to obtain geometric feature information, and the acquisition of training data needs to rely on a camera array constituted by a large number of expensive single lens reflex (SLR) cameras; and then resolving and reconstruction are performed through multi-view geometry, and a unified Topological structure is registered to. These training data are not only expensive and has a long acquisition cycle, but also limited in number and diversity due to limited acquisition environment, resulting in being difficult to be directly used in supervision training. In order to solve this problem, synthetic three-dimensional data are used for reconstruction in some methods, but there are certain differences between synthetic data and real data, resulting in a large difference between the obtained three-dimensional face model and the real face, and rendering poor fidelity of the obtained three-dimensional face model.

In addition, most of the existing methods for generating a three-dimensional face model may only restore the contour information of the face, but can hardly obtain facial details, rendering poor fidelity of the obtained three-dimensional face model.

Furthermore, a face contained in the two-dimensional image may be occluded by objects or self-occluded. The existing methods for generating a three-dimensional face model cannot recover the occluded parts well, which also affects the fidelity of the three-dimensional face model.

Based on the above researches, the embodiments of the disclosure provide a method for generating a three-dimensional model. Through first point cloud data including contour information of a first face and a first image containing the first face, first albedo information of the first face and second point cloud data including detail information of the first face are determined. Based on the first albedo information and the second point cloud data, a three-dimensional model of the first face is generated. In this process, the first albedo information may represent texture features of the facial surface, and the second point cloud data includes the detail information of the face; therefore, a three-dimensional model of the first face obtained by fusing the first albedo information of the first face and the detail information of the first face has higher fidelity.

All the defects in the above solutions are the results of the inventor found after practice and careful research. Therefore, the process of discovering the above problems and the solutions proposed in disclosure below to solve the above problems should be the contributions made by the inventor to the disclosure during the process of the disclosure.

It should be noted that similar reference numerals and letters indicate similar items in the following drawings. Therefore, once an item is defined in a drawing, it does not need to be further defined or explained in the subsequent drawings.

For convenient understanding of the embodiments of the disclosure, a method for generating a three-dimensional model disclosed in the embodiments of the disclosure is firstly introduced in detail. The executing subject of the method for generating a three-dimensional model provided in the embodiments of the disclosure is generally a computer device with certain computing capabilities. The computer device includes, for example, a terminal device or a server or other processing devices. The terminal device may be user equipment (UE), mobile devices, user terminals, terminals, cellular phones, cordless phones, and personal digital assistants (PDAs), handheld devices, computing devices, vehicle-mounted devices, wearable devices, etc. In some embodiments, the method for generating a three-dimensional model may be implemented by a processor calling computer-readable instructions stored in a memory.

The method for generating a three-dimensional model according to the embodiments of the disclosure will be described below with an example that the executing subject is a computer device.

Referring to FIG. 1 which illustrates a schematic flowchart of a method for generating a three-dimensional model according to embodiments of the disclosure, the method includes actions S101-S104.

In S101, a first image containing a first face is acquired.

In S102, first point cloud data including contour information of the first face is determined based on the first image.

In S103, first albedo information of the first face and second point cloud data including detail information of the first face are determined based on the first point cloud data and the first image.

In S104, a three-dimensional model of the first face is generated based on the first albedo information and the second point cloud data.

Figure 2A:
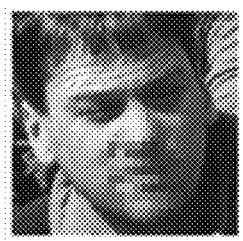
FIG. 2a illustrates a schematic diagram of a face image in a method for generating a three-dimensional model according to embodiments of the disclosure.
Figure 2B:
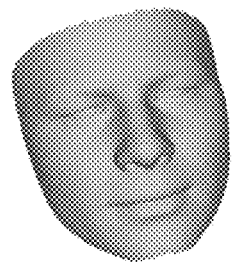
FIG. 2b illustrates a schematic diagram of a face contour constituted by first point cloud data in a method for generating a three-dimensional model according to embodiments of the disclosure.
Figure 2C:
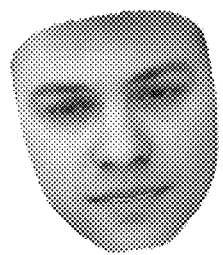
FIG. 2c illustrates a schematic diagram of an image constituted by first albedo information of a face in a method for generating a three-dimensional model according to embodiments of the disclosure.
Figure 2D:
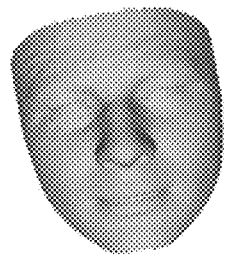
FIG. 2d illustrates a schematic diagram of an example that is constituted by second point cloud data and includes not only face contour information but also facial detail information in a method for generating a three-dimensional model according to embodiments of the disclosure.
Figure 3A:
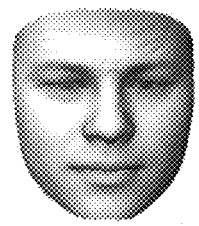
FIG. 3a illustrates a schematic diagram of a three-dimensional model obtained by applying illumination in a direction to the three-dimensional model in a method for generating a three-dimensional model according to embodiments of the disclosure.
Figure 3B:
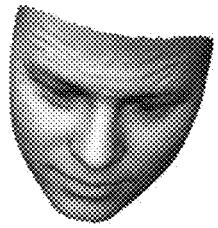
FIG. 3b illustrates a schematic diagram of a three-dimensional model obtained by applying illumination in a direction to the three-dimensional model in a method for generating a three-dimensional model according to embodiments of the disclosure.
Figure 3C:
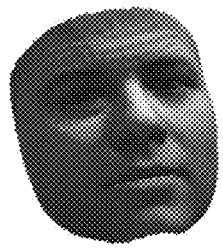
FIG. 3c illustrates a schematic diagram of a three-dimensional model obtained by applying illumination in a direction to the three-dimensional model in a method for generating a three-dimensional model according to embodiments of the disclosure.
Figure 3D:
FIG. 3d illustrates a schematic diagram of a three-dimensional model obtained by applying illumination in a direction to the three-dimensional model in a method for generating a three-dimensional model according to embodiments of the disclosure.

The face image acquired for the face generally includes the following information: albedo information, illumination information, contour information, texture detail information. As illustrated in FIG. 2a, there is illustrated a schematic diagram of a face image. Since the image of a real person is used, the face of the real person is partially mosaicked in the drawing. Illumination information is used to represent the light and shadow changes at different facial sites due to the illumination directions, the face contours, and the ups and downs of the facial organs. Contour information refers to the overall contour of the face, such as the external contours of the cheek, facial organs, and forehead. The contour information may represent the structure of the face in a coarse scale, and FIG. 2b illustrates an example of a face contour constituted by the first point cloud data. The albedo information is used to represent the skin surface of a face, and FIG. 2c illustrates an example of an image constituted by the first albedo information of a face. The detail information refers to the facial details, such as wrinkles and expression lines, and FIG. 2d illustrates an example that is constituted by the second point cloud data and includes both face contour information and facial detail information. By fusing albedo information, illumination information, contour information, and detail information, a face image with a high degree of restoration may be obtained.

In order to generate a three-dimensional face model based on a two-dimensional face image, the albedo information, contour information, and detail information of the face for example may be obtained based on the image containing the face to finally obtain the three-dimensional face model.

In addition, illumination in different directions may be applied to the three-dimensional face model to obtain the three-dimensional model added to the illumination information, so that the three-dimensional face model has higher fidelity. FIGS. 3a to 3d illustrate three-dimensional face models obtained by applying illumination in four directions to the three-dimensional model.

The above actions S101-S104 will be described in detail below.

I: in the above actions S101, the first image may be acquired in different manners for different executing subjects. For example, in the case where the executing subject is a terminal device, a camera installed in the terminal device may be called to acquire the first image containing the first face in real time. A photo album of the terminal device may be called to obtain the first image. A face image may also be received from other devices. In the case where the executing subject is a server, the server may receive the first image from other devices, or may call the first image stored in a database connected to the server.

In some embodiments, when acquiring the first image, an original image containing the first face is firstly acquired, and then the position of the face in the original image is recognized by using a certain face recognition method. The first image containing the first face is captured based on position of the face in the original image.

II: in the above action S102, for example, the first point cloud data including the contour information of the first face may be obtained based on the first image by using any coarse-grained facial geometry reconstruction method.

For example, low-frequency information in the face image that is contour information of the face may be obtained by reconstructing a three-dimensional face in the first image by using a 3-Dimensional Morphable Model (3DMM).

When obtaining the first point cloud data by using 3DMM, multiple first point cloud points are defined in 3DMM. There is a direct or indirect connection relationship between different first point cloud points, and at least three first point cloud points constitute a face patch. The contour of the first face is represented by multiple face patches each constituted by multiple first point cloud points. 3DMM may predict positions of the multiple pre-defined first point cloud points, to obtain the three-dimensional coordinate values of each first point cloud point in its own local coordinate system. Then, based on the camera parameters, the coordinate values of the first point cloud point in the local coordinate system predicted by 3DMM is converted into three-dimensional coordinate values in the camera coordinate system. The first point cloud data may include: the three-dimensional coordinate values of each of the multiple first point cloud points constituting the first face in the camera coordinate system, and the connection relationship information between different first point cloud points.

In this way, through the first point cloud data, the contour information of the first face may be expressed.

Figure 4:
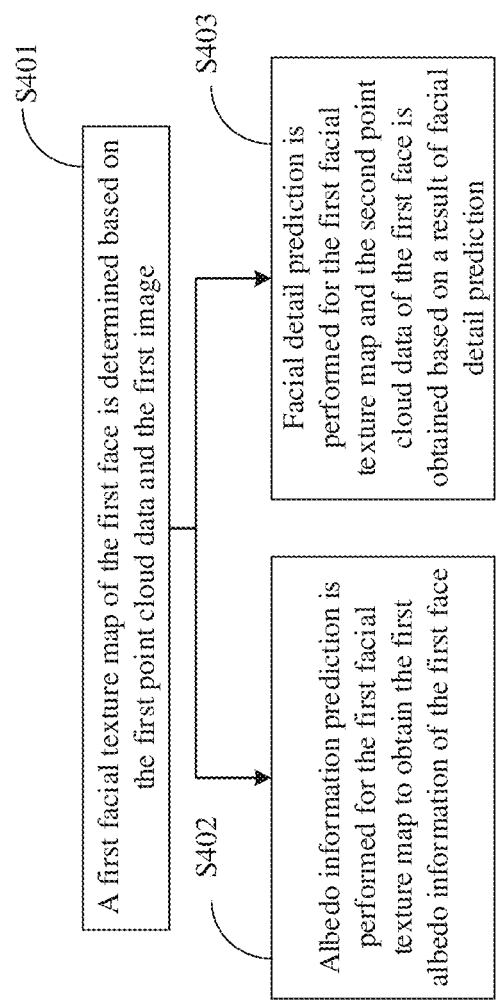
FIG. 4 illustrates a schematic flowchart of a specific method for obtaining first albedo information and second point cloud data according to embodiments of the disclosure.

III: in the above action S103, referring to FIG. 4, for example, the first albedo information and the second point cloud data may be obtained in the following manner.

In S401, a first facial texture map of the first face is determined based on the first point cloud data and the first image.

Here, the first facial texture map of the first face may be determined based on the first point cloud data and the first image for example in the following way. The multiple first point cloud points are aligned with multiple first pixels in the first image respectively based on the three-dimensional coordinate values of the multiple first point cloud points in the camera coordinate system. Second pixel values corresponding to each of multiple face patches constituting the first face are determined based on a result of the alignment, the connection relationship information between the different ones of the multiple first point cloud points, and first pixel values of the multiple first pixels in the first image. Each of the multiple face patches is constituted by at least three first point cloud points having a connection relationship with each other. The first facial texture map is generated based on the second pixel values corresponding to each of the multiple face patches.

In this way, the generated first facial texture map retains the features in the first image as much as possible, so that a three-dimensional model of the face may be better obtained based on the first facial texture map.

In some embodiments, in aligning the multiple first point cloud points with the multiple first pixels in the first image respectively, for example, key point recognition may be performed for the first face in the first image to determine target first pixels in the first image corresponding to multiple key points of the first face respectively. Then, a target first point cloud point corresponding to each key point is determined from the multiple first point cloud points based on the correspondence between the first point cloud points and the multiple key points in the first face. Then for each key point, the target first pixel corresponding to the key point and the target first point cloud point corresponding to the key point are aligned with each other in the image dimensions, to finally obtain a first pixel in the first image corresponding to each first point cloud point.

Then the pixel values in the first image corresponding to each of the face patches that constitute the first face is pulled out from the first image by means of the connection relationship information between different first point cloud points, and the color rendering is performed on each of the face patches based on the pixel values corresponding to the face patch, to finally obtain the first facial texture map.

The obtained first facial texture map contains both the illumination information of the first face and the first albedo information of the first face.

Following the above S401, the method for obtaining the first albedo information and the second point cloud data provided in the embodiments of the present disclosure further includes as follows.

In S402, albedo information prediction is performed for the first facial texture map to obtain the first albedo information of the first face.

Here, for example, albedo information prediction may be performed for the first facial texture map by using a pre-trained first neural network, to obtain the first albedo information of the first face.

Figure 5:
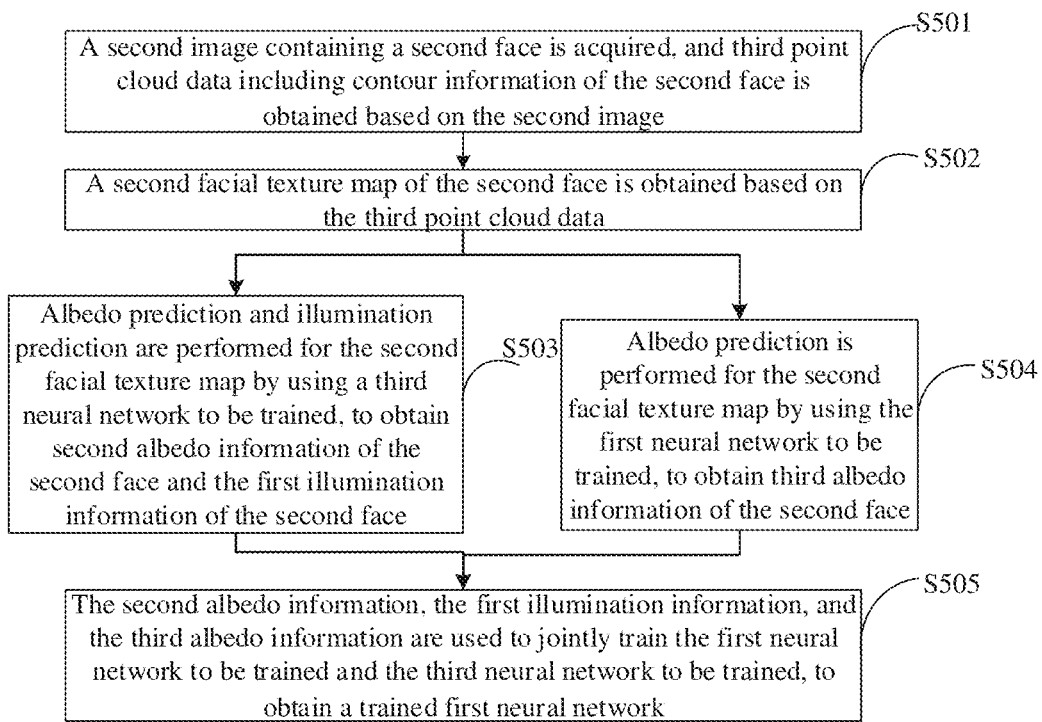
FIG. 5 illustrates a schematic flowchart of a method for training a first neural network according to embodiments of the disclosure.

In some embodiments, referring to FIG. 5, the embodiments of the present disclosure provide a specific method for training the first neural network. The method includes following actions S501-S505:

In S501, a second image containing a second face is acquired, and third point cloud data including contour information of the second face is obtained based on the second image.

Here, the third point cloud data of the second face may be obtained in a similar way of obtaining the first point cloud data of the first face in the above embodiments, which will not be repeated here.

In S502, a second facial texture map of the second face is obtained based on the third point cloud data.

Here, the second facial texture map of the second face may be obtained in a similar way of obtaining the first facial texture map of the first face in the above embodiments, which will not be repeated here.

In S503, albedo prediction and illumination prediction are performed for the second facial texture map by using a third neural network to be trained, to obtain second albedo information of the second face and the first illumination information of the second face.

Here, exemplarily, the part of the third neural network used in albedo prediction may be abstracted as an operator shown in the following formula (1): a principal components analysis (PCA) albedo model:

$$R_a = m_a + U_a p_a \quad (1)$$

$m_a$ represents the neutral albedo in the albedo model, and $U_a$ represents the base in the albedo model. $p_a \in R^{199}$ is the coefficient of albedo. For example, $m_a$ may be obtained in the following manner the albedo information of the faces of 199 people is acquired, and the average value of the albedo information of the faces of 199 people is calculated to obtain $m_a \cdot U_a$ is for example obtained by performing PCA projection on the acquired albedo information of 199 faces. $R_a$ represents the second albedo information of the second face, which includes the albedo value r corresponding to each third point cloud point in the third point cloud data. The third neural network may obtain $p_a$ by prediction, and then obtain the first albedo information of the first face based on the above formula (1).

The illumination in the embodiments of the present disclosure is, for example, Lambertian reflectance, and a second-order spherical harmonics (SH) base function is used to represent the first illumination information, which includes the illumination values corresponding to each third point cloud point in the third point cloud data.

In S504, albedo prediction is performed for the second facial texture map by using the first neural network to be trained, to obtain third albedo information of the second face.

Here, there is no sequential order of executing S504 and S503.

In some embodiments, the first neural network to be trained is, for example, a neural network having a UNet structure. The UNet network includes multiple feature extraction layers, and up-sampling layers corresponding to at least some of the multiple target feature extraction layers respectively. For any target feature extraction layer, the feature data output by the target feature extraction layer will serve as part of the input data of the corresponding up-sampling layer to participate in the up-sampling process in the up-sampling layer. Thus, more feature information may be retained in the output data of the up-sampling layer.

In some embodiments of the disclosure, among multiple target feature extraction layers, the feature data output by at least one target feature extraction layer will be flipped and then input into the corresponding up-sampling layer. In this way, the site of the face that is self-occluded or occluded by foreign objects may be reconstructed through the symmetry of the face.

Here, the flip of feature is, for example, to transform the feature map from $$\begin{bmatrix} a_{00} & a_{01} & a_{02} & a_{03} \\ a_{10} & a_{11} & a_{12} & a_{13} \\ a_{20} & a_{21} & a_{22} & a_{23} \\ a_{30} & a_{31} & a_{32} & a_{33} \end{bmatrix} \text{ to } \begin{bmatrix} a_{03} & a_{02} & a_{01} & a_{00} \\ a_{13} & a_{12} & a_{11} & a_{10} \\ a_{23} & a_{22} & a_{21} & a_{20} \\ a_{33} & a_{32} & a_{31} & a_{30} \end{bmatrix}.$$

S505: The second albedo information, the first illumination information, and the third albedo information are used to jointly train the first neural network to be trained and the third neural network to be trained, to obtain a trained first neural network.

Here, in using the second albedo information, the first illumination information, and the third albedo information to jointly train the first neural network to be trained and the third neural network to be trained, the following actions S51-S53 may be performed.

In S51, a first loss of the third neural network to be trained is determined by using the second albedo information and the first illumination information.

In determining the first loss of the third neural network to be trained by using the second albedo information and the first illumination information, for example the following actions may be performed. Second normal vectors respectively corresponding to multiple third point cloud points in the third point cloud data are determined based on the third point cloud data. A third facial texture map of the second face is generated based on the second normal vectors, the second albedo information, and the first illumination information. The first loss is generated based on the second facial texture map and the third facial texture map.

Here, for any third point cloud point, since the third point cloud point may belong to multiple face patches at the same time, the second normal vector corresponding to the third point cloud point may be the average value of the normal vectors respectively corresponding to the multiple face patches to which the third point cloud point belongs.

In the third point cloud data, the rendering color of any third point cloud point in the third facial texture map satisfies the following formula (2):

$$I_{syn}(n, r, \gamma) = r \cdot \sum_{b=1}^{B^2} \gamma_b H_b(n) \qquad (2)$$

B=3, n represents the second normal vector, r represents the albedo information at any third point cloud point; y represents the illumination coefficient; H (n) represents the illumination information at any third point cloud point.

All the third point cloud points may only be rendered into a set of colors in the third facial texture map and rendered into an image to obtain the third facial texture map. Then, the first loss is generated based on the third facial texture map and the second facial texture map.

In this case, the first loss $E_{pixel}^1$ of the third neural network to be trained satisfies the following formula (3):

$$E_{pixel}^1 = |I_t(UV) - I_{syn}^1(UV)| \qquad (3)$$

$I_t(UV)$ represents the second facial texture map. $I_{syn}^1(UV)$ represents the third facial texture map.

In some embodiments, the cost function $E_{B-Net}$ of the third neural network satisfies the following formula (4):

$$E_{B-Net} = E_{pixel}^1 + w_a E_a \qquad (4)$$

$E_a = \|p_a\|^2$ is a regularization item and $w_a$ is a super parameter.

In S52, a second loss of the first neural network to be trained is determined by using the second albedo information, the first illumination information, and the third albedo information.

There is no sequential order of executing actions S51 and S52.

In some embodiments, for example, the second loss of the first neural network to be trained may be obtained in the following way:

A first sub-loss is determined based on the second albedo information and the third albedo information. A fourth facial texture map of the second face is generated based on the second normal vectors, the third albedo information, and the first illumination information, and a second sub-loss is generated based on the fourth facial texture map and the second facial texture map. A third sub-loss is generated based on a feature map of the fourth facial texture map and a feature map of the second facial texture map. The second loss is obtained based on the first sub-loss, the second sub-loss, and the third sub-loss.

Exemplarily, the cost function $E_{A-Net}$ of the first neural network satisfies the following formula (5):

$$E_{A-Net} = \min_G \max_D E_{GAN(G,D)} + E_G \qquad (5)$$

$E_{GANG(G,D)}$ is the first sub-loss and satisfies the following formula (6)

$$E_{GANG(G,D)} = E_x[\log D(x)] + E_z[\log(1 - D(G(z)))] \qquad (6)$$

G represents a generator and D represents a discriminator. z represents the third albedo information; x represents the second albedo information; E(·) represents an expectation.

$E_G$ satisfies the following formula (7):

$$E_G = w_{pixel} E_{pixel}^2 + w_{percep} E_{percep} \qquad (7)$$

$E_{pixel}^2$ is the second sub-loss.

Here, the manner of generating the fourth facial texture map based on the second normal vectors, the third albedo information, and the first illumination information is similar to the above manner of generating the third facial texture map, and will not be repeated here. In addition, the specific manner of calculating $E_{pixel}^2$ is similar to that of the above $E_{pixel}^1$ and will not be repeated here.

$E_{percep}$ is the third sub-loss, also referred to as the perception loss, which satisfies the following formula (8):

$$E_{percep} = \frac{1}{n} \sum_{j}^{n} \frac{\|F_j(I_t(UV)) - F_j(I_{syn}^2(UV))\|}{H_j W_j C_j} \qquad (8)$$

$I_{syn}^2(UV)$ represents the fourth facial texture map; F is a pre-trained neural network, and $F_j$ represents the feature map output by the $j^{th}$ network layer of the pre-trained neural network. H, W, and C represent the size of the feature map output by the $j^{th}$ network layer. Both $w_{pixel}$ and $w_{percep}$ are super parameters.

Exemplarily, the pre-trained neural network is, for example, visual geometry group (VGG)-16 trained on ImageNet.

In S53, network parameters of the third neural network to be trained are updated based on the first loss, and network parameters of the first neural network to be trained are updated based on the second loss. The trained first neural network is obtained by multiple times of updating the network parameters of the third neural network to be trained and the network parameters of the first neural network to be trained.

By the above actions S51-S53, the training process of the first neural network is implemented.

It may be seen from the above training process of the first neural network that, the embodiments of the present disclosure are based on the principle of weak supervision and do not need to label the training data, thereby realizing the training of the first neural network and the second neural network. In the training process, the third point cloud data is generated by using an existing model firstly, and then supervision information (such as the first illumination information, and the second albedo information) is generated based on the third point cloud data by using the third neural network used in a training phase. Further, training of the first neural network and the second neural network are implemented by using the weak supervision information generated by the third neural network.

Following the above action S401, the method for obtaining the first albedo information and the second point cloud data provided in the embodiments of the present disclosure may further include as follows:

In S403, facial detail prediction is performed for the first facial texture map, and the second point cloud data of the first face is obtained based on a result of the facial detail prediction.

Here, there is no sequential order of executing actions S402 and S403.

Here, the result of the facial detail prediction includes: first facial detail information of the first face. In such a case, obtaining the second point cloud data of the first face based on the result of the facial detail prediction includes, for example, fusing the first point cloud data and the first facial detail information to obtain the second point cloud data.

In this way, through the prediction of the first albedo information and the facial details for the first facial texture map, the second point cloud data that includes the face contour, the facial details and face albedo is obtained. The second point cloud data may more accurately represent three-dimensional model.

In some embodiments, the first facial detail information includes: a movement distance of each of the multiple first point cloud points in a first normal vector direction corresponding to the first point cloud point. Here, for any first point cloud point, since the first point cloud point may belong to multiple face patches at the same time, the first normal vector corresponding to the first point cloud point is the average value of the first normal vectors corresponding to the multiple face patches to which the first point cloud point belongs.

In some embodiments, for example, detail prediction may be performed for the first facial texture map by using a pre-trained second neural network to obtain first facial detail information of the first face.

Figure 6:
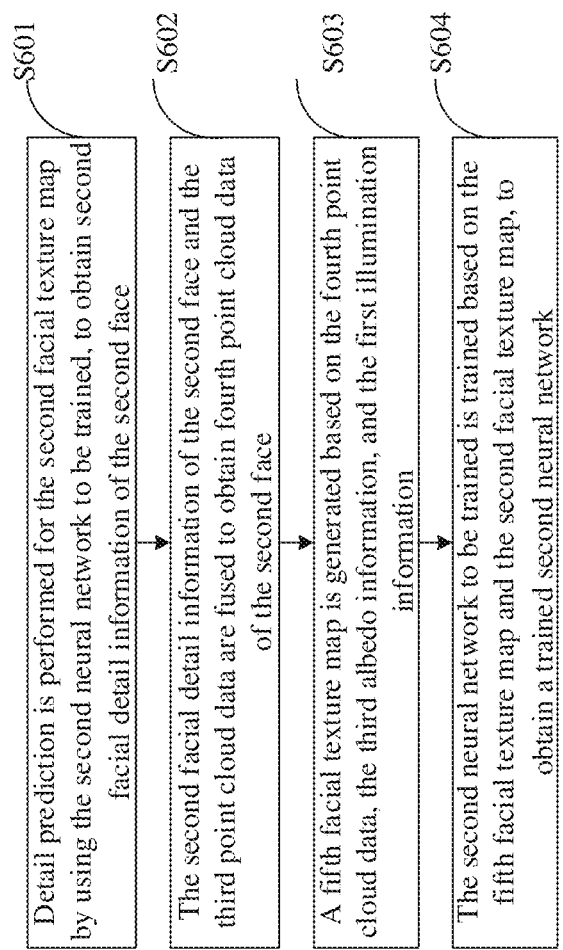
FIG. 6 illustrates a schematic flowchart of a method for training a second neural network according to embodiments of the disclosure.

Referring to FIG. 6, the embodiments of the present disclosure provide a specific method for training a second neural network. The method includes following actions S601-S604:

In S601: detail prediction is performed for the second facial texture map by using the second neural network to be trained, to obtain second facial detail information of the second face.

Here, the second facial detail information includes, for example, a movement distance of each of multiple third point cloud points in a second normal vector direction corresponding to the third point cloud point.

In S602, the second facial detail information of the second face and the third point cloud data are fused to obtain fourth point cloud data of the second face.

In some embodiments, fusing the second facial detail information of the second face and the third point cloud data is implemented in the following way. The position of each third point cloud point in the third point cloud data in the camera coordinate system is adjusted by using the movement distance of the third point cloud point in the direction of the second normal vector corresponding to the third point cloud point, and the fourth point cloud data is obtained based on the result of adjusting the multiple third point cloud points, so that the face represented by the obtained fourth point cloud data may show the detail information of the face.

In S603, a fifth facial texture map is generated based on the fourth point cloud data, the third albedo information, and the first illumination information.

Here, the manner of generating the fifth facial texture map is similar to the above manner of generating the third facial texture map, and will not be repeated here.

In S604, the second neural network to be trained is trained based on the fifth facial texture map and the second facial texture map, to obtain a trained second neural network.

Here, for example, the third loss may be obtained by using the fifth facial texture map and the second facial texture map, and then the network parameters of the second neural network to be trained may be adjusted by using the third loss. A trained second neural network is obtained after multiple rounds of adjusting the network parameters of the neural network to be trained.

In some embodiments, the cost function $E_{D\text{-}Net}$ of the second neural network satisfies the following formula (9):

$$E_{D\text{-}Net}=w_{gard}E_{gard}+w_{const}E_{const}+w_{smooth}E_{smooth} \quad (9)$$

$E_{gard}$ represents the gradient loss, and satisfies $E_{gard}=|\nabla I_t(UV)-\nabla I_{syn}^3(UV)|$. $\nabla$ represents the gradient calculation process. The operator $I_{syn}^3(UV)$ represents the fifth facial texture map. $w_{gard}$, $w_{const}$ and $w_{smooth}$ respectively represent the weights of different loss items, which are super parameters.

In some embodiments, when calculating the gradient, for example, the Sobel operator may be taken as a convolution kernel, and the convolution kernel may be used to perform convolution on the fifth facial texture map to obtain the gradient information of the fifth facial texture map. The manner of calculating the gradient information of the second facial texture map is similar to the manner of acquiring the gradient information of the fifth facial texture map.

$E_{const}=|\Delta d|$, so that $\Delta d$ is limited to a certain range, avoiding excessive differences between the generated three-dimensional model and the second face resulted from excessive deformation of the face constructed by the three-dimensional point cloud data due to the $\Delta d$.

$E_{smooth}$ represents a smooth loss, which represents that the height difference between the third point cloud points that are close to each other will not be too large.

In some embodiments, $E_{smooth}$ may be calculated by the following formula (10):

$$E_{smooth}=\Sigma_{v_i \in V}\Sigma_{v_j \in Neib(v_i)}\|\Delta d_i - \Delta d_j\|^2 \quad (10)$$

V represents the set of all third point cloud points; $v_i$ represents the $i^{th}$ third point cloud point; $Neib(v_i)$ represents the set of all third point cloud points that have a direct connection relationship with the $i^{th}$ third point cloud point.

Figure 7:
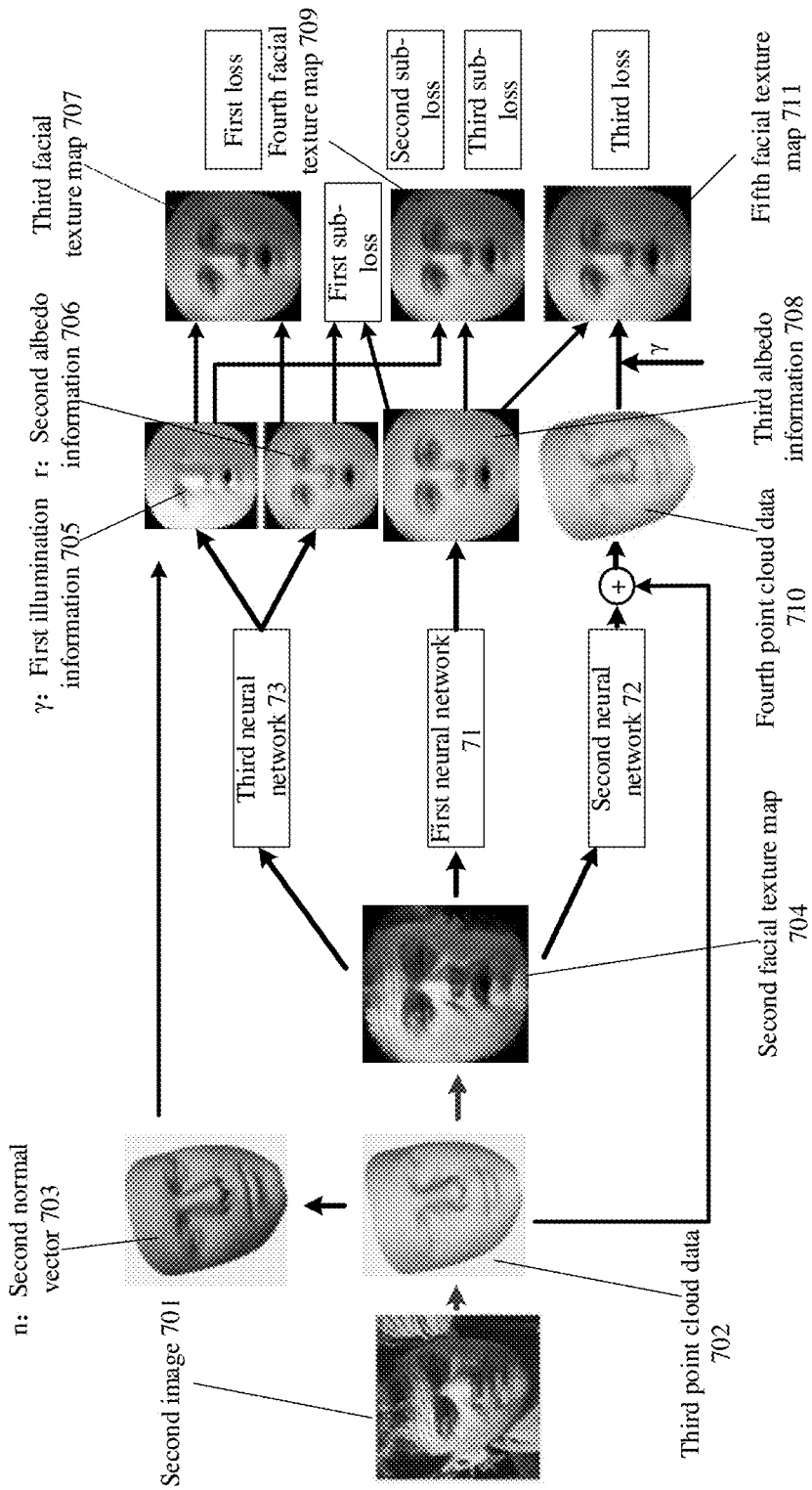
FIG. 7 illustrates a schematic flowchart of a method for jointly training a first neural network and a second neural network according to embodiments of the disclosure.

In some embodiments, referring to FIG. 7, a specific example of training the first neural network and the second neural network is also provided. In this embodiment, a second image 701 is acquired (since a real person image is used, the face of the real person is partially mosaicked), and then third point cloud data 702 of the second image 701 is acquired by using 3DMM. Then a second normal vector 703 of each third point cloud point in the third point cloud data is determined based on the third point cloud data 702. A second facial texture map 704 is obtained based on the third point cloud data 702 and the second image 701. Next, the second facial texture map 704 is respectively input to the first neural network 71, the second neural network 72 and the third neural network 73 that are to be trained.

First illumination information 705 and second albedo information 706 are output through the third neural network 73 to be trained, and a third facial texture map 707 is generated based on the second normal vector 703, the first illumination information 705 and the second albedo information 706. A first loss is obtained based on the third facial texture map 707 and the second facial texture map 704. Network parameters of the third neural network 73 to be trained are updated based on the first loss.

Third albedo information 708 is output through the first neural network 71 to be trained. A first sub-loss is obtained based on the second albedo information 706 and the third albedo information 708. A fourth facial texture map 709 is generated based on the third albedo information 708 and the first illumination information 705. A second sub-loss and a third sub-loss are obtained based on the fourth facial texture map 709 and the second facial texture map 704. Network parameters of the first neural network 71 to be trained are updated based on the first sub-loss, the second sub-loss, and the third sub-loss.

Facial detail information is output through the second neural network 72 to be trained, and the facial detail information and the third point cloud data 702 are fused to obtain the fourth point cloud data 710. Then a fifth facial texture map 711 is obtained by using the fourth point cloud data 710, the third albedo information 708, and the first illumination information 705; and a third loss is obtained by using the fifth facial texture map 711 and the second facial texture map 704. Network parameters of the second neural network 72 to be trained are updated based on the third loss.

Through multiple rounds of updating the network parameters of the first neural network 71 and the network parameters of the second neural network 72, the trained first neural network 71 and second neural network 72 are obtained.

IV: in the above action S104, when the first albedo information and the second point cloud data are fused, since the first albedo information actually includes the color corresponding to each of the second point cloud points in the second point cloud data, color rendering is performed for each of the second point cloud points based on the first albedo information to obtain a three-dimensional model of the first face.

In the embodiments of the disclosure, firstly, the first point cloud data including the contour information of the first face is determined based on the first image; then the first albedo information of the first face and the second point cloud data including the detail information of the first face are determined based on the first point cloud data and the first image, and the first albedo information and the second point cloud data are fused, so that the obtained three-dimensional model of the first face contains both the albedo information of the first face and the contour information and detail information of the first face. Thus, the generated three-dimensional model of the first face has higher fidelity.

Those skilled in the art may understand that in the above methods of the detailed description, the writing order of various actions does not mean a strict execution order that constitutes any limitation on the implementation process. The specific execution order of actions should be determined by their functions and possible internal logics.

The embodiments of the present disclosure provide a method for generating a three-dimensional model, which may reconstruct high-quality facial albedo and facial detail based on a single face image and a weakly supervised learning method.

This method may be implemented in the following manner Firstly, 3DMM is used to perform coarse face reconstruction on the face image by fitting, to obtain the face contour. Then, the 3DMM low-frequency albedo model is used to train a boosting network (B-Net) to obtain the illumination coefficients of the face image and the low-frequency albedo distribution of the real face. Subsequently, according to the obtained illumination coefficients of the face image and the low-frequency albedo distribution information of the real face, an image-to-image facial albedo network (FAN) is trained through weak supervision to obtain the albedo information of the face image. A patch discriminator may be used to conduct adversarial training on the albedo distribution. Finally, after the trained FAN is obtained, a detail recovering network (DRN) is trained through weak supervision to obtain the geometric details of the face that offset along the normal vector directions of the original mesh.

In the above method for generating a three-dimensional model, the structure and training method of the boosting network are not limited. Exemplarily, the structure of the boosting network may be any suitable neural network that is based on a boosting algorithm. During implementation, the boosting network may be realized as any model that may provide illumination estimation and generate distribution of complete albedo. The complete albedo refers to the albedo without wearing objects, makeup, occlusion by objects, and posture occlusion. The structures of DRN and FAN are image-to-image networks, and may be a structure improved based on Unet-8. Exemplarily, the step size of the first convolution layer in Unet-8 may be changed from 2 to 1, and the structure may be modified to ensure that the size of the deepest feature map of Unet is 1×1. In addition, after the first convolution layer, the feature map is flipped and concatenated with the original feature map and input to the next layer. The improvement of the Unet-8 structure may preserve the information of the input image as much as possible, and may refer to the information of the facial symmetry instead of directly assuming the facial symmetry. Here, FAN and DRN are trained by using the illumination and albedo distribution information predicted by the boosting network (such as 3DMM coefficients). The loss function in training may be determined as needed, which will not be limited here. When training the FAN, the adversarial loss of albedo distribution needs to be supervised. The supervision information of the adversarial loss may enable the predicted albedo distribution to be close to the albedo distribution obtained by training as much as possible. That is, complete albedo may be generated, which is helpful to complement the occluded facial area to avoid the influence of occlusion. DRN training is mainly based on the pixel gradient loss, which can avoid a large false effect on the details caused by the large difference between the unrestricted input image and the rendered image. In addition, the output of DRN is the offset based on the normal vector direction of the original mesh vertices, so that holes, or face patches covering each other may not easily occur. The facial albedo and facial details finally obtained based on FAN and DRN may be rendered under different illumination and postures.

Compared with related art, the method for generating a three-dimensional model provided in the embodiments of the disclosure has the following differences. 1) face reconstruction is performed by means of a encoder-decoder structure or the image-to-image structure obtained through supervised training in the related art, whereas face reconstruction is performed by means of an image-to-image structure obtained by weakly supervised training in the embodiments of the disclosure. 2) For the prediction of albedo distribution, based on a certain albedo, it is assumed that regularization items (such as symmetry, and local consistency) are added or non-adversarial training and other weak supervision information is used, and facial skin area detection is required in related art; whereas adversarial training is employed, and facial skin area detection and regularization items are not required in the embodiments of disclosure. 3) The geometric detail of the face in the related art is output as the Z-direction offset in the depth image, whereas the geometric details of the face in the embodiment of the present disclosure are output as offsets in the vertex normal directions. 4) The DRN is trained based on the pixel color differences in the related art, whereas the DRN is trained based on the pixel gradient difference in the embodiments of the disclosure.

The embodiments of the disclosure may achieve the following technical effects:

1) The sense of reality of the weakly supervised recovering of the facial surface albedo is improved. The recovering of details through a weak supervision method in the related art mainly includes two types. One is to predict the coefficients of the 3DMM albedo model. Since the 3DMM albedo model is only obtained by training with a small amount of faces acquired indoor, the model has limited expression ability, and only extremely low frequency albedo may be recovered, and higher frequency albedo information is difficult to be recovered. The other is to perform prediction completely based on the nonlinear deep neural network. Due to lack of constraints, regularization item constraints need to be added during training to prevent the obtained albedo from being affected by the occlusion, and the finally obtained albedo has poorer sense of reality. There are also some methods that use supervised training which however needs acquiring a large amount of training data, and need to generalize the images acquired under unconstrained conditions during training, otherwise there will be a problem of poor robustness. In the embodiments of the disclosure, the image-to-image deep learning network is used to predict the albedo, and the albedo completion is realized through weak supervision of the low-frequency albedo distribution, etc., which can reconstruct the more realistic albedo, and more naturally completes the occluded part in the input image. If the face of the input image is frontal and there is no much occlusion during use, the training can be performed in a targeted manner to finally obtain a more realistic result.

2) Reliable geometric details of the face on the mesh are obtained by the weakly supervised learning. In the related art, the offset of the depth map is mainly predicted. Non-rigid registration is required when acting on the original mesh and the original mesh is easy to be damaged, such as holes or overlaps may occur. In the embodiments of the disclosure, the offsets along the normal directions of the original mesh are predicted. Movement in the direction of the normal vector is less likely to cause damage to the original mesh, and the pixel gradient loss during training makes the details less likely to be affected by shadows; thus reliable geometric details of the face may be obtained.

The method for generating a three-dimensional model provided in the embodiments of the disclosure may be applied to virtual social networks, digital face avatar generation (such as face avatar generation at mobile phones), real-time facial animation driving, and beauty makeup applications (such as checking the beauty makeup effects in different directions and under different degrees of illumination) and other scenes. For example, when a user performs face reconstruction based on a single image, geometric details of the face such as face albedo and wrinkles may need to be recovered. If there is not a large amount of face scanning data that may be used for supervised training, weakly supervised training is required. When using the trained model, if the recovered albedo cannot naturally eliminate the occluded part in the input image, or the recovered albedo is rough and loses the sense of reality, the method for generating a three-dimensional model provided in the embodiments of the disclosure may be used to reconstruct the albedo. In addition, when the user needs to restore the geometric details of the face, if the reconstructed details are likely to cause damage to the mesh, the method for generating a three-dimensional model provided embodiments of the present disclosure may also be used.

It should be noted that the above albedo may be considered as the color of skin under natural light, and the adversarial loss used in the adversarial training enables the two albedo distributions to be close to each other, rather than being close in some specific prediction. In implementation, the FAN may be used as the first neural network in the above embodiments, the DRN may be used as the second neural network in the above embodiments, and the boosting network may be used as the third neural network in the above embodiments.

Based on the same inventive concept, the embodiments of the disclosure further provide an apparatus for generating a three-dimensional model corresponding to the method for generating a three-dimensional model. Since the principle of the apparatus in the embodiments of the disclosure to solve the problem is similar to the above method for generating a three-dimensional model in the embodiments of the disclosure, the implementation of the apparatus may refer to the implementation of the method. The repeated part will not be described again.

Figure 8:
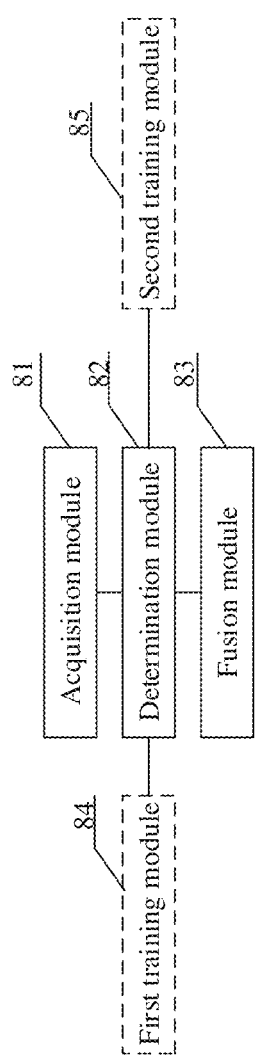
FIG. 8 illustrates a schematic structural diagram of an apparatus for generating a three-dimensional model according to embodiments of the disclosure.

FIG. 8 illustrates a schematic diagram of an apparatus for generating a three-dimensional model according to embodiments of the disclosure. The apparatus includes an acquisition module 81, a determination module 82, and a fusion module 83.

The acquisition module 81 is configured to: acquire a first image containing a first face, and to obtain, based on the first image, first point cloud data including contour information of the first face.

The determination module 82 is configured to obtain, based on the first point cloud data and the first image data, first albedo information of the first face and second point cloud data including detail information of the first face.

The fusion module 83 is configured to obtain a three-dimensional model of the first face based on the first albedo information and the second point cloud data.

In some embodiments, in determining, based on the first point cloud data and the first image, the first albedo information of the first face and the second point cloud data including the detail information of the first face, the determination module 82 is configured to: determine a first facial texture map of the first face based on the first point cloud data and the first image; perform albedo information prediction for the first facial texture map to obtain the first albedo information of the first face; and perform facial detail prediction for the first facial texture map, and obtain the second point cloud data of the first face based on a result of the facial detail prediction.

In some embodiments, the first point cloud data includes: three-dimensional coordinate values of multiple first point cloud points constituting the first face in a camera coordinate system, and connection relationship information between different ones of the multiple first point cloud points.

In some embodiments, in determining the first facial texture map of the first face based on the first point cloud data and the first image, the determination module 82 is configured to: align the multiple first point cloud points with multiple first pixels in the first image respectively based on the three-dimensional coordinate values of the multiple first point cloud points in the camera coordinate system; determine second pixel values corresponding to each of multiple face patches constituting the first face based on a result of the alignment, the connection relationship information between the different ones of the multiple first point cloud points, and first pixel values of the multiple first pixels in the first image, each of the face patches being constituted by at least three first point cloud points having a connection relationship with each other; and generate the first facial texture map based on the second pixel values corresponding to each of the multiple face patches.

In some embodiments, the result of the facial detail prediction includes: first facial detail information of the first face. In obtaining the second point cloud data of the first face based on the result of the facial detail prediction, the determination module 82 is configured to: fuse the first point cloud data and the first facial detail information to obtain the second point cloud data.

In some embodiments, the first facial detail information includes: a movement distance of each of the multiple first point cloud points in a first normal vector direction corresponding to the first point cloud point. In fusing the first point cloud data and the first facial detail information to obtain the second point cloud data, the determination module 82 is configured to: for each of the multiple first point cloud points, adjust a position of the first point cloud point in the camera coordinate system based on the movement distance of the first point cloud point in the first normal vector direction corresponding to the first point cloud point, and based on three-dimensional coordinate values of the first point cloud point in the camera coordinate system; and obtain the second point cloud data based on results of adjusting the multiple first point cloud points.

In some embodiments, in performing albedo information prediction for the first facial texture map to obtain the first albedo information of the first face, the determination module 82 is configured to: perform albedo information prediction for the first facial texture map by using a pre-trained first neural network, to obtain the first albedo information of the first face.

In some embodiments, the apparatus further includes a first training module 84. The first training module 84 is configured to train the first neural network by: acquiring a second image containing a second face, and obtaining third point cloud data including contour information of the second face based on the second image; obtaining a second facial texture map of the second face based on the third point cloud data; performing albedo prediction and illumination prediction for the second facial texture map by using a third neural network to be trained, to obtain second albedo information of the second face and first illumination information of the second face; performing albedo prediction for the second facial texture map by using the first neural network to be trained, to obtain third albedo information of the second face; and using the second albedo information, the first illumination information, and the third albedo information to jointly train the first neural network to be trained and the third neural network to be trained, to obtain a trained first neural network.

In some embodiments, in using the second albedo information, the first illumination information, and the third albedo information to jointly train the first neural network to be trained and the third neural network to be trained, to obtain the trained first neural network, the first training module 84 is configured to: determine a first loss of the third neural network to be trained, by using the second albedo information and the first illumination information; determine a second loss of the first neural network to be trained, by using the second albedo information, the first illumination information, and the third albedo information; update, based on the first loss, network parameters of the third neural network to be trained, and update, based on the second loss, network parameters of the first neural network to be trained; and obtain the trained first neural network by multiple times of updating the network parameters of the third neural network to be trained and the network parameters of the first neural network to be trained.

In some embodiments, in determining the first loss of the third neural network to be trained, by using the second albedo information and the first illumination information, the first training module 84 is configured to: determine, based on the third point cloud data, second normal vectors respectively corresponding to multiple third point cloud points in the third point cloud data; generate a third facial texture map of the second face based on the second normal vectors, the second albedo information, and the first illumination information; and generate the first loss based on the second facial texture map and the third facial texture map.

In some embodiments, in determining the second loss of the first neural network to be trained, by using the second albedo information, the first illumination information, and the third albedo information, the first training module 84 is configured to: determine a first sub-loss based on the second albedo information and the third albedo information; generate a fourth facial texture map of the second face based on the second normal vectors, the third albedo information, and the first illumination information, and generate a second sub-loss based on the fourth facial texture map and the second facial texture map; generate a third sub-loss based on a feature map of the fourth facial texture map and a feature map of the second facial texture map; and obtain the second loss based on the first sub-loss, the second sub-loss, and the third sub-loss.

In some embodiments, in performing facial detail prediction for the first facial texture map, and obtaining the second point cloud data of the first face based on the result of the facial detail prediction, the determination module 82 is configured to: perform detail prediction for the first facial texture map by using a pre-trained second neural network, to obtain first facial detail information of the first face.

In some embodiments, the apparatus further includes a second training module 85. The second training module is configured to train the second neural network by: performing detail prediction for the second facial texture map by using the second neural network to be trained, to obtain second facial detail information of the second face; fusing the second facial detail information of the second face and the third point cloud data to obtain fourth point cloud data of the second face; generating a fifth facial texture map based on the fourth point cloud data, the third albedo information, and the first illumination information; and training the second neural network to be trained based on the fifth facial texture map and the second facial texture map, to obtain a trained second neural network.

For the descriptions of the processing flow of the modules in the apparatus and the interaction flow between the modules, reference may be made to the relevant description in the above method embodiments, which will not be described in detail here again.

Figure 9:
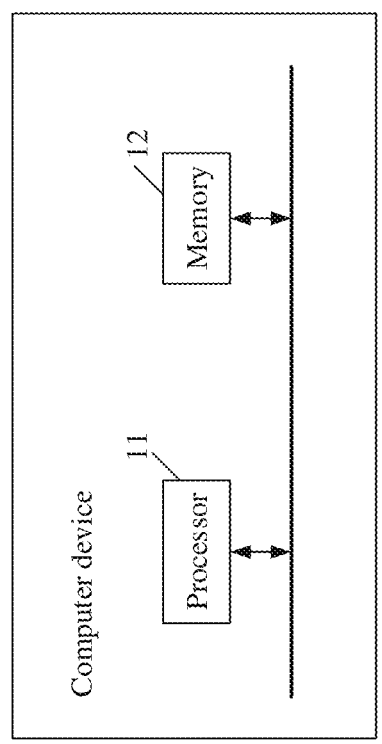
FIG. 9 illustrates a schematic structural diagram of a computer device according to embodiments of the disclosure.

The embodiments of the disclosure further provide a computer device. As illustrated in FIG. 9 which illustrates a schematic structural diagram of a computer device according to embodiments of the disclosure. The computer device includes: a processor 11 and a memory 12. The memory 12 stores machine-readable instructions executable by the processor 11, and when the computer device is running, the machine-readable instructions are executed by the processor to implement the following actions: acquiring a first image containing a first face; determining, based on the first image, first point cloud data including contour information of the first face; determining first albedo information of the first face and second point cloud data including detail information of the first face based on the first point cloud data and the first image; and generating a three-dimensional model of the first face based on the first albedo information and the second point cloud data.

For the specific execution process of the above instructions, reference may be made to the actions in the method for generating a three-dimensional model described in the embodiments of the disclosure, which will not be repeated here.

The embodiments of the disclosure further provide a computer-readable storage medium having stored thereon a computer program that, when run by a processor, causes the processor to execute the actions in the method for generating a three-dimensional model described in the above method embodiments. The storage medium may be a volatile or non-volatile computer readable storage medium.

A computer program product corresponding to the method for generating a three-dimensional model provided in the embodiments of the disclosure includes a computer-readable storage medium storing program code. The instructions included in the program code may be configured to perform the actions in the method for generating a three-dimensional model described in the above method embodiments. Reference can be made to the above method embodiments for details, which will not be repeated here.

The embodiments of the disclosure further provide a computer program which, when executed by a processor, implements any one of the methods in the above embodiments. The computer program product may be specifically implemented by hardware, software, or a combination thereof. In an embodiment, the computer program product is specifically embodied as a computer storage medium. In another embodiment, the computer program product is specifically embodied as a software product, such as a software development kit (SDK).

Those skilled in the art may clearly understand that, for the convenience and conciseness of the description, the specific working process of the system and apparatus described above may refer to the corresponding process in the above method embodiments, which will not be repeated here. In the embodiments provided in the disclosure, it should be understood that the disclosed system, apparatus, and method may be implemented in other manners. The apparatus embodiments described above are merely illustrative. For example, the division of units is only a logical function division, and there may be other divisions in actual implementation. For example, multiple units or components may be combined or integrated into another system, or some features may be ignored or not implemented. In addition, the displayed or discussed mutual coupling or direct coupling or communication connection may be indirect coupling or communication connection through some communication interfaces, apparatuses or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the disclosure may be integrated into one processing unit, or each unit may exist alone physically, or two or more units may be integrated into one unit.

If the function is implemented in the form of a software functional unit and sold or used as an independent product, it may be stored in a non-volatile computer readable storage medium executable by a processor. Based on this understanding, the technical solutions of the disclosure essentially or the part that contributes to the prior art or the part of the technical solution may be embodied in the form of a software product, and the computer software product is stored in a storage medium, including several instructions that are used to make a computer device (which may be a personal computer, a server, or a network device, etc.) execute all or some of the actions of the methods described in the various embodiments of the disclosure. The above storage medium includes: a USB flash disk, a mobile hard disk, a read-only memory (ROM), random access memory (RAM), magnetic disk or optical disk and other media that can store program code.

Finally, it should be noted that the above are only detailed description of the disclosure, which are used to explain rather than limit the technical solutions of the disclosure. The protection scope of the disclosure is not limited thereto. Although the disclosure has been described in detail with reference to the above embodiments, those ordinary skill in the art should understand that any person familiar with the techniques in the art may still modify or easily conceive of changes to the technical solutions described in the above embodiments, or equivalently replace some of the technical features. These modification, changes or replacements do not make the essence of the corresponding technical solutions deviate from the spirit and scope of the technical solutions of the embodiments in the disclosure, and should fall within the protection scope of the disclosure. Therefore, the protection scope of the disclosure should be subject to the claims.

INDUSTRIAL APPLICABILITY

The embodiments of the disclosure provide a method and apparatus for generating a three-dimensional model, a computer device, storage medium, and a computer program product. The method includes as follows: a first image containing a first face is acquired; first point cloud data including contour information of the first face is determined based on the first image; first albedo information of the first face and second point cloud data including detail information of the first face are determined based on the first point cloud data and the first image; and a three-dimensional model of the first face is generated based on the first albedo information and the second point cloud data. According to the embodiments of the disclosure, a three-dimensional model of a face may be generated by using a two-dimensional face image, and the generated three-dimensional model of the face has higher fidelity.

The invention claimed is:
1. A method for generating a three-dimensional model, comprising:
   acquiring a first image containing a first face;
   determining, based on the first image, first point cloud data comprising contour information of the first face;

determining, based on the first point cloud data and the first image, first albedo information of the first face by using a first neural network trained by weak supervision and determining, based on the first point cloud data and the first image, second point cloud data comprising detail information of the first face by using a second neural network trained by weak supervision; and generating a three-dimensional model of the first face based on the first albedo information and the second point cloud data;

wherein the first neural network is trained by:

acquiring a second image containing a second face, and obtaining third point cloud data comprising contour information of the second face based on the second image;

obtaining a second facial texture map of the second face based on the third point cloud data;

performing albedo prediction and illumination prediction for the second facial texture map by using a third neural network to be trained, to obtain second albedo information of the second face and first illumination information of the second face;

performing albedo prediction for the second facial texture map by using the first neural network to be trained, to obtain third albedo information of the second face; and using the second albedo information, the first illumination information, and the third albedo information to jointly train the first neural network to be trained and the third neural network to be trained, to obtain a trained first neural network.

2. The method for generating the three-dimensional model according to claim 1, wherein determining, based on the first point cloud data and the first image, the first albedo information of the first face by using the first neural network trained by weak supervision and determining, based on the first point cloud data and the first image, the second point cloud data comprising the detail information of the first face by using the second neural network trained by weak supervision comprises:

determining a first facial texture map of the first face based on the first point cloud data and the first image;

performing albedo information prediction for the first facial texture map by using the first neural network to obtain the first albedo information of the first face; and performing facial detail prediction for the first facial texture map by using the second neural network, and obtaining the second point cloud data of the first face based on a result of the facial detail prediction.

3. The method for generating the three-dimensional model according to claim 2, wherein the first point cloud data comprises:

three-dimensional coordinate values of a plurality of first point cloud points constituting the first face in a camera coordinate system, and connection relationship information between different ones of the plurality of first point cloud points.

4. The method for generating the three-dimensional model according to claim 3, wherein determining the first facial texture map of the first face based on the first point cloud data and the first image comprises:

aligning the plurality of first point cloud points with a plurality of first pixels in the first image respectively based on the three-dimensional coordinate values of the plurality of first point cloud points in the camera coordinate system;

determining second pixel values corresponding to each of a plurality of face patches constituting the first face based on a result of the alignment, the connection relationship information between the different ones of the plurality of first point cloud points, and first pixel values of the plurality of first pixels in the first image, wherein each of the plurality of face patches is constituted by at least three first point cloud points having a connection relationship with each other; and generating the first facial texture map based on the second pixel values corresponding to each of the plurality of face patches.

5. The method for generating the three-dimensional model according to claim 2, wherein the result of the facial detail prediction comprises first facial detail information of the first face; and obtaining the second point cloud data of the first face based on the result of the facial detail prediction comprises:

fusing the first point cloud data and the first facial detail information to obtain the second point cloud data.

6. The method for generating the three-dimensional model according to claim 5, wherein the first facial detail information comprises: a movement distance of each of a plurality of first point cloud points in a first normal vector direction corresponding to the first point cloud point; and fusing the first point cloud data and the first facial detail information to obtain the second point cloud data comprises:

for each of the plurality of first point cloud points, adjusting a position of the first point cloud point in a camera coordinate system based on the movement distance of the first point cloud point in the first normal vector direction corresponding to the first point cloud point, and based on three-dimensional coordinate values of the first point cloud point in the camera coordinate system; and obtaining the second point cloud data based on results of adjusting the plurality of first point cloud points.

7. The method for generating the three-dimensional model according to claim 1, wherein using the second albedo information, the first illumination information, and the third albedo information to jointly train the first neural network to be trained and the third neural network to be trained, to obtain the trained first neural network comprises:

determining a first loss of the third neural network to be trained, by using the second albedo information and the first illumination information;

determining a second loss of the first neural network to be trained, by using the second albedo information, the first illumination information, and the third albedo information;

updating, based on the first loss, network parameters of the third neural network to be trained, and updating, based on the second loss, network parameters of the first neural network to be trained; and obtaining the trained first neural network by a plurality of times of updating the network parameters of the third neural network to be trained and the network parameters of the first neural network to be trained.

8. The method for generating the three-dimensional model according to claim 7, wherein determining the first loss of the third neural network to be trained, by using the second albedo information and the first illumination information comprises:

determining, based on the third point cloud data, second normal vectors respectively corresponding to a plurality of third point cloud points in the third point cloud data;

generating a third facial texture map of the second face based on the second normal vectors, the second albedo information, and the first illumination information; and generating the first loss based on the second facial texture map and the third facial texture map.

9. The method for generating the three-dimensional model according to claim 8, wherein determining the second loss of the first neural network to be trained, by using the second albedo information, the first illumination information, and the third albedo information comprises:

determining a first sub-loss based on the second albedo information and the third albedo information;

generating a fourth facial texture map of the second face based on the second normal vectors, the third albedo information, and the first illumination information, and generating a second sub-loss based on the fourth facial texture map and the second facial texture map;

generating a third sub-loss based on a feature map of the fourth facial texture map and a feature map of the second facial texture map; and obtaining the second loss based on the first sub-loss, the second sub-loss, and the third sub-loss.

10. The method for generating the three-dimensional model according to claim 1, wherein the second neural network is trained by:

performing detail prediction for the second facial texture map by using the second neural network to be trained, to obtain second facial detail information of the second face;

fusing the second facial detail information of the second face and the third point cloud data to obtain fourth point cloud data of the second face;

generating a fifth facial texture map based on the fourth point cloud data, the third albedo information, and the first illumination information; and training the second neural network to be trained based on the fifth facial texture map and the second facial texture map, to obtain a trained second neural network.

11. A computer device comprising:

a processor, and a memory having stored thereon machine-readable instructions executable by the processor, wherein the processor is configured to execute the machine-readable instructions stored in the memory, and the machine-readable instructions, when executed by the processor, cause the processor to execute actions of a method for generating a three-dimensional model, the method comprising:

acquiring a first image containing a first face;

determining, based on the first image, first point cloud data comprising contour information of the first face;

determining, based on the first point cloud data and the first image, first albedo information of the first face by using a first neural network trained by weak supervision and determining, based on the first point cloud data and the first image, second point cloud data comprising detail information of the first face by using a second neural network trained by weak supervision; and generating a three-dimensional model of the first face based on the first albedo information and the second point cloud data;

wherein the first neural network is trained by:

acquiring a second image containing a second face, and obtaining third point cloud data comprising contour information of the second face based on the second image;

obtaining a second facial texture map of the second face based on the third point cloud data;

performing albedo prediction and illumination prediction for the second facial texture map by using a third neural network to be trained, to obtain second albedo information of the second face and first illumination information of the second face;

performing albedo prediction for the second facial texture map by using the first neural network to be trained, to obtain third albedo information of the second face; and using the second albedo information, the first illumination information, and the third albedo information to jointly train the first neural network to be trained and the third neural network to be trained, to obtain a trained first neural network.

12. The computer device according to claim 11, wherein determining, based on the first point cloud data and the first image, the first albedo information of the first face by using the first neural network trained by weak supervision and determining, based on the first point cloud data and the first image, the second point cloud data comprising the detail information of the first face by using the second neural network trained by weak supervision comprises:

determining a first facial texture map of the first face based on the first point cloud data and the first image;

performing albedo information prediction for the first facial texture map by using the first neural network to obtain the first albedo information of the first face; and performing facial detail prediction for the first facial texture map by using the second neural network, and obtaining the second point cloud data of the first face based on a result of the facial detail prediction.

13. The computer device according to claim 12, wherein the first point cloud data comprises:

three-dimensional coordinate values of a plurality of first point cloud points constituting the first face in a camera coordinate system, and connection relationship information between different ones of the plurality of first point cloud points.

14. The computer device according to claim 13, wherein determining the first facial texture map of the first face based on the first point cloud data and the first image comprises:

aligning the plurality of first point cloud points with a plurality of first pixels in the first image respectively based on the three-dimensional coordinate values of the plurality of first point cloud points in the camera coordinate system;

determining second pixel values corresponding to each of a plurality of face patches constituting the first face based on a result of the alignment, the connection relationship information between the different ones of the plurality of first point cloud points, and first pixel values of the plurality of first pixels in the first image, wherein each of the plurality of face patches is constituted by at least three first point cloud points having a connection relationship with each other; and generating the first facial texture map based on the second pixel values corresponding to each of the plurality of face patches.

15. The computer device according to claim 12, wherein the result of the facial detail prediction comprises first facial detail information of the first face; and obtaining the second point cloud data of the first face based on the result of the facial detail prediction comprises:
fusing the first point cloud data and the first facial detail information to obtain the second point cloud data.

16. The computer device according to claim 15, wherein the first facial detail information comprises: a movement distance of each of a plurality of first point cloud points in a first normal vector direction corresponding to the first point cloud point; and
fusing the first point cloud data and the first facial detail information to obtain the second point cloud data comprises:
for each of the plurality of first point cloud points, adjusting a position of the first point cloud point in a camera coordinate system based on the movement distance of the first point cloud point in the first normal vector direction corresponding to the first point cloud point, and based on three-dimensional coordinate values of the first point cloud point in the camera coordinate system; and
obtaining the second point cloud data based on results of adjusting the plurality of first point cloud points.

17. A non-transitory computer-readable storage medium having stored thereon a computer program that, when run by a computer device, causes the computer device to execute actions in a method for generating a three-dimensional model, the method comprising:
acquiring a first image containing a first face;
determining, based on the first image, first point cloud data comprising contour information of the first face;
determining, based on the first point cloud data and the first image, first albedo information of the first face by using a first neural network trained by weak supervision and determining, based on the first point cloud data and the first image, second point cloud data comprising detail information of the first face by using a second neural network trained by weak supervision; and
generating a three-dimensional model of the first face based on the first albedo information and the second point cloud data;
wherein the first neural network is trained by:
acquiring a second image containing a second face, and obtaining third point cloud data comprising contour information of the second face based on the second image;
obtaining a second facial texture map of the second face based on the third point cloud data;
performing albedo prediction and illumination prediction for the second facial texture map by using a third neural network to be trained, to obtain second albedo information of the second face and first illumination information of the second face;
performing albedo prediction for the second facial texture map by using the first neural network to be trained, to obtain third albedo information of the second face; and
using the second albedo information, the first illumination information, and the third albedo information to jointly train the first neural network to be trained and the third neural network to be trained, to obtain a trained first neural network.

* * * * *